United States Patent [19]

Naruse

[11] Patent Number: 5,154,433
[45] Date of Patent: Oct. 13, 1992

[54] PISTON RING

[75] Inventor: Yoshio Naruse, Tokyo, Japan

[73] Assignee: Teikoku Piston Ring Co., Ltd., Tokyo, Japan

[21] Appl. No.: 715,541

[22] Filed: Jun. 14, 1991

[51] Int. Cl.$^5$ .............................. F16J 9/28; F16J 9/26
[52] U.S. Cl. ............................ 277/235 R; 277/224; 277/235 A; 277/DIG. 6
[58] Field of Search .................. 277/224, 223, 235 A, 277/236, DIG. 6, 235 R; 428/621, 627, 628, 938

[56] References Cited

U.S. PATENT DOCUMENTS

| | | | |
|---|---|---|---|
| 2,873,154 | 2/1959 | Marker | 277/235 A |
| 3,615,099 | 10/1971 | Prasse | 277/235 A |
| 4,407,515 | 10/1983 | Naito | 277/224 X |
| 4,570,946 | 2/1986 | Tsuchiya et al. | 277/224 X |
| 4,579,355 | 4/1986 | Hooroki | 277/224 X |

FOREIGN PATENT DOCUMENTS 57-57868  4/1982  Japan .
63-57964  3/1988  Japan .

OTHER PUBLICATIONS

*Plasma Science and Technology,* by Herman V-Boenig Cornell University Press (Ithica, N.Y.) 1982 pp. 260–276.

Primary Examiner—Allan N. Shoap
Attorney, Agent, or Firm—Paul & Paul

[57] ABSTRACT

A piston ring comprises a martensitic stainless steel ring having a nitrided layer formed in the surface portion thereof, and a titanium nitride film coated on the outer sliding surface of the ring by an ion-plating process. According to a first embodiment of the present invention, the titanium nitride film has a nitrogen concentration which is gradually increased toward the top surface thereof to gradually lower a toughness of the film toward the top surface and to make a surface portion of the film more brittle than the other portion of the film. On the other hand, according to a second embodiment of the present invention, the titanium nitride film has a nitrogen concentration which is gradually decreased toward the top surface and to make a surface hardness of the film HV 1800 or less.

4 Claims, 8 Drawing Sheets

AMOUNT OF WEAR

PISTON RING

BACKGROUND OF THE INVENTION

1. Field of the Invention

The present invention relates to a piston ring used in an internal combustion engine, and more particularly, to a stainless steel piston ring coated with a film having a superior wear-resistance, a superior anti-seizure property, and a quick break-in time (a superior initial adaptability).

2. Description of the Related Art

A hard chromium plating process has been widely adopted for a surface treatment of an outer sliding surface of a piston ring, because a piston ring coated with such a hard chromium plating film has a superior wear-resistance and causes less wear of a piston cylinder in contact with the piston ring. Recently, however, the power and rotation speed of an engine have been further increased, and thus the piston ring operates under more severe conditions. The hard chromium plating film can not sufficiently withstand such severe conditions, and accordingly, there is a need for an improved piston ring having a stronger wear-resistance and anti-seizure property.

Such an improved piston ring is plasma spray-coated with an Fe-Cr system film, is a stainless steel piston ring processed with a nitriding treatment, or is a piston ring plated with a composite film containing a ceramic powder, and these kinds of piston rings have been developed and adopted in some engines. The thus-developed piston rings have a remarkably improved wear-resistance and anti-seizure (anti-scoring) property, when compared with the conventional piston rings, but also have the following disadvantages.

The piston ring coated with a Fe-Cr system plasma sprayed film has a superior wear-resistance and anti-seizure property, but causes a large amount of wear of the piston cylinder. Furthermore, when this piston ring is exposed to a corrosive atmosphere, the metal-sprayed film is often separated from the ring. The piston ring coated with a composite plating film containing a ceramic powder has a superior anti-seizure property, but the matrix strength of the coated composite film is a problem in that the film cracks and is separated from the piston ring during an engine operation. The stainless steel piston ring processed with a nitriding treatment has a superior wear-resistance and causes less wear of the cylinder, but has a low anti-seizure property and causes problems in an engine under a high heat-load.

To improve the nitrided stainless steel piston ring, the outer sliding surface of the piston ring (i.e., the nitrided layer) is coated with a titanium nitride film having a desired (predetermined) thickness, by an ion-plating process. The current titanium nitride film however, does not seat in a cylinder wall quickly, and if the film has a surface roughness of more than 0.6 μm Rz, it causes a large amount of wear of the cylinder.

SUMMARY OF THE PRESENT INVENTION

Taking the above-mentioned piston rings into consideration, an object of the present invention is to provide a further improved stainless steel piston ring subjected to a nitriding treatment to be coated with a titanium nitride film, having a superior wear-resistance, a superior anti-seizure property and causing little wear of a cylinder.

The above-mentioned object and other objects of the present invention are attained by providing an improved piston ring comprising a stainless steel ring having a nitrided layer formed in the surface portion thereof, and a titanium nitride film coated at least on the outer sliding surface of said ring by an ion-plating process. According to this first embodiment of the present invention, the titanium nitride ($Ti_xN_y$) film has a nitrogen concentration which is gradually increased toward the top surface thereof by increasing a nitrogen partial pressure during the ion-plating process to gradually lower a toughness of the film toward the top surface and to make a surface portion of the film more brittle than the other portion of the film. Furthermore, according to this second embodiment of the present invention, the titanium nitride film has a nitrogen concentration which is gradually decreased toward the top surface thereof by lowering a nitrogen partial pressure during the ion-plating process to gradually lower a hardness of the film toward the top surface and to make a surface hardness of the film HV 1800 or less.

In both the first and second embodiments of the present invention, preferably the stainless steel is martensitic stainless steel, in view of required flexibility and strength of the piston ring.

The adoption of the ion-plating process allows the use of a temperature of the stainless steel ring heated during the coating of the titanium nitride film to remain at 500° C. or less, at this does not lower a hardness of the nitrided layer of the ring and does not cause a softening and deformation of the ring, and whereby a nitrogen concentration (or a hardness) of the titanium nitride film can be freely controlled.

In general, a conventional high hardness titanium nitride coating film has a superior wear-resistance and anti-seizure property, but as a surface roughness of the film becomes greater, the wear of a cylinder (i.e., a body in contact with the film) is rapidly increased. Therefore, it is necessary to control the surface roughness to 0.6 μm Rz or less, and to shape an outer surface of the piston ring into a smooth, large radius arc, to ensure that there is no local generation of a high pressure. Although such controls are carried out, under severe conditions of an elevated temperature and a high pressure, the piston ring with the conventional titanium nitride film still has a disadvantage of causing a large amount of wear of the cylinder. Furthermore, piston rings without the titanium nitride film may generate scuffing on the cylinder surface, when the inner surface of the cylinder is given a mirror-finish surface prior to a fitting of the piston ring in the cylinder.

According to the present invention, since the piston ring is coated with a titanium nitride film, a surface portion of which is brittle or a surface hardness thereof is limited to less than HV 1800, in an initial period of an engine operation, the surface portion of the titanium nitride film is worn at an early stage, to thereby provide good sliding surface conditions whereby the titanium nitride film having a superior wear-resistance slides on the inner surface of the cylinder such that little initial wear of the cylinder surface of the cylinder such that little initial wear of the cylinder surface occurs. Moreover, fundamental tests and bench tests have proved that the anti-seizure (resistance to scoring) property of the piston ring according to the present invention is superior to that of conventional piston rings. It is considered that the wear in the early stage occurs rapidly and thus prevent local contact (metal contact when viewed on a micro-scale) during the initial operation, with the result that the anti-seizure (resistance to scoring) property is improved.

BRIEF DESCRIPTION OF THE DRAWINGS

The present invention will be more apparent from the description of the preferred embodiments set forth below, with reference to the accompanying drawings, in which.

DESCRIPTION OF THE PREFERRED EMBODIMENTS

Figure 1:
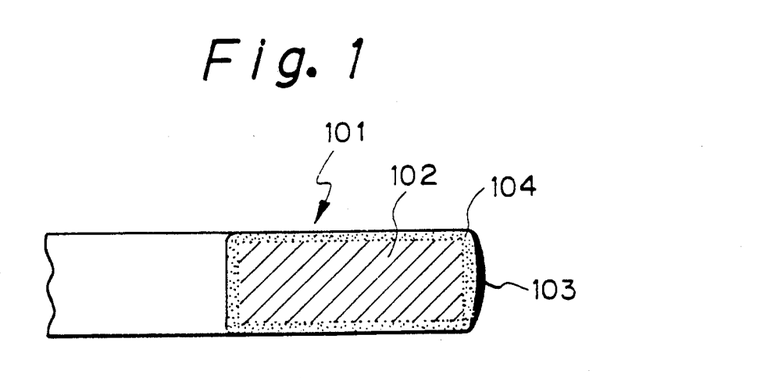
FIG. 1 is a partially sectional view of a piston ring according to the present invention.
Figure 2:
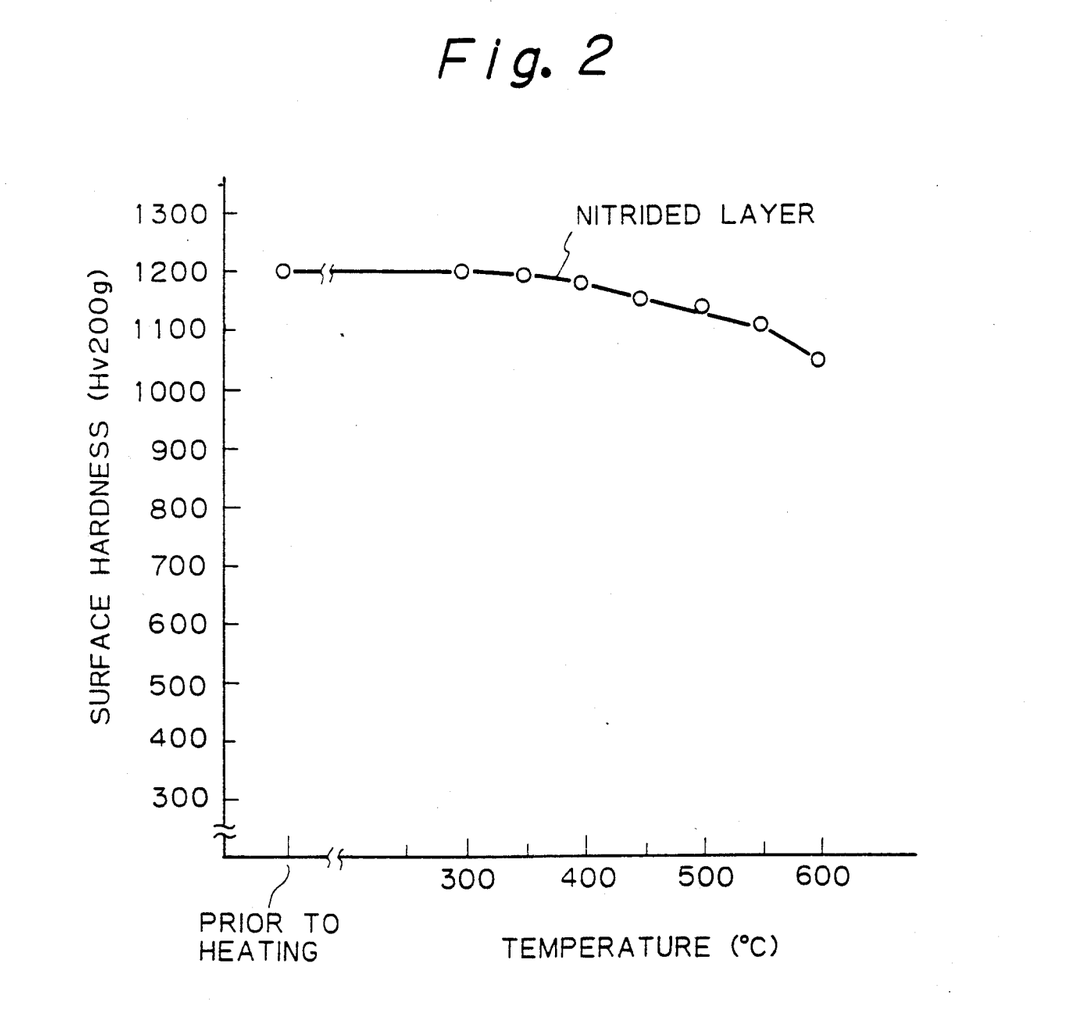
FIG. 2 is a graph showing a relationship between a surface hardness of a nitrided layer of stainless steel and a heating temperature.

Referring to FIG. 1, a piston ring 101 is comprised of a martensitic stainless steel ring 102 and a titanium nitride film 103 deposited on the outer sliding surface of the ring 102 by an ion-plating process. The ring 102 is made of, e.g., SUS 440B (JIS G4303, corresponding to AISI 440B). The ring 102 is subjected to a gaseous nitriding treatment to form a nitrided layer 104 in the surface portion thereof, and then machined to remove a surface oxide layer and a white layer of the nitrided layer 104. For the gaseous nitriding treatment, the ring of SUS 440B was subjected to a conventional nitriding treatment to form the nitrided layer, and then heated at a temperature of from 300° to 600° C. for one hour. An oxide layer and a white layer inevitably formed on the nitrided layer were removed, and a hardness of the nitrided layer was measured to obtain variations of the nitrided layer hardness (HV) as shown in FIG. 2. The hardness is gradually reduced from the initial hardness of 1200 HV in accordance with the elevation of the heating temperature, and it can be seen that a heating temperature of 500° C. or less does not cause a problem of an insufficient hardness.

According to the first embodiment of the present invention, the titanium nitride film 103 has a nitrogen concentration which is gradually increased toward the top surface thereof, to thus gradually lower a toughness of the film toward the top surface and to make a surface portion of the film more brittle than the other portion of the film. On the other hand, according to the second embodiment of the present invention, the titanium nitride film 103 has a nitrogen concentration which is gradually decreased toward the top surface thereof, to thus gradually lower a hardness of the film toward the top surface and to make a surface hardness of the film HV 1800 or less.

EXAMPLE 1

Figure 3:
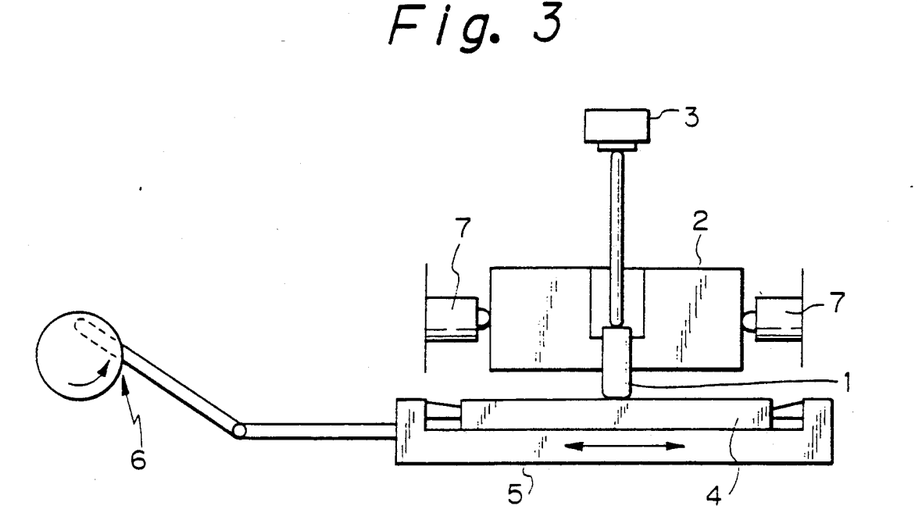
FIG. 3 is a schematic view of a reciprocating type wear tester.

A wear test was performed by using a reciprocating type wear tester as shown in FIG. 3, under the following conditions.

In the wear tester of FIG. 3, an upper test piece 1 corresponding to a piston ring was held in a stationary block 2 and a downward load was applied thereto by an actuator (e.g., an oil cylinder) 3. The block 2 is interposed between two load cells 7. A lower test piece 4 coming in to contact with the upper test piece 1 is held in a movable block 5, and is reciprocated in the directions indicated by an arrow by a crank mechanism 6.

(1) Test pieces:

A. the lower test piece 4 was a plate having a length of 70 mm, a width of 17 mm and a thickness of 14 mm, and was made of the cast iron normally FC 25, JIS G5501) used for a cylinder block. A test surface of the piece 4 was buffed to a surface roughness 0.1 μm or less, and had a hardness of HRB 90.

(2) B the upper test piece 1 was a martensitic stainless steel rod having a diameter of 8 mm and a length of 23 mm, and was made of SUS 440B. An end portion of the piece 1 was machined to form a spherical end having a radius of 18 mm, and the piece 1 was subjected to the following surface treatment to thus form samples 1 to 4.

Sample 1 (prior art):

The upper test piece 1 was subjected to a gaseous nitriding treatment, was spherically remachined to an 18 mm radius to remove an oxide layer and a white layer of the nitrided layer, and then finished by a buffing process. The obtained Sample 1 (piston ring) was provided with a nitride layer having a thickness of 90 μm and a hardness of HV 1200.

Sample 2 (prior art):

The upper test piece 1 was subjected to a gaseous nitriding treatment, was spherically remachined to an 18 mm radius to remove an oxide layer and a white layer of the nitrided layer, and then finished by a buffing process; these treatments are the same as used for the Sample 1. The obtained test piece 1 was set in an ion-plating device and coated with a titanium nitride film under the following process conditions.

(1) Evacuation (formation of vacuum) to a vacuum pressure of $1 \times 10^{-6}$ Torr;

(2) Heating of the test piece by a heater at a temperature of 350° C.;

(3) Ion-bombardment in an Ar gas atmosphere for 15 minutes;

(4) Reevacuation to a vacuum pressure of $1 \times 10^{-6}$ Torr;

(5) Melting of titanium;

(6) Introduction of a nitrogen (N$_2$) gas at a constant partial pressure of $3 \times 10^{-4}$ to $5 \times 10^{-4}$ Torr;

(7) Cooling; and (8) Taking the test piece 1 out of a treating chamber after an ambient condition is obtained.

The obtained test piece 1 (Sample 2) was provided with the titanium nitride film having a hardness of HV 2400 and a thickness of 2.5 μm, and the nitrided layer had a hardness of HV 1200 and a thickness of 90 μm.

Sample 3 (present invention):

The upper test piece 1 was subjected to a gaseous nitriding treatment, was spherically remachined to an 18 mm radius to remove an oxide layer and a white layer of the nitrided layer, and then finished by a buffing process; these treatments are the same as those used for the Sample 1. The obtained test piece 1 was set in an ion-plating device and coated with a titanium nitride film, in a similar manner to that of the above-mentioned Sample 2, except that the introduction of the nitrogen gas (partial pressure of $N_2$) in the step 6 was increased under the following conditions.

| | |
|---|---|
| 3 to 5 × 10$^{-4}$ Torr | 40 min.; |
| 1 × 10$^{-4}$ Torr | 30 min.; |
| 5 × 10$^{-3}$ Torr | 20 min.; |
| 3 × 10$^{-3}$ Torr | 15 min.; and |
| 1 × 10$^{-3}$ Torr | 10 min.; |

The obtained test piece 1 (Sample 3) was provided with the titanium nitride film having a hardness of HV 2000 and a thickness of 2.5 μm, and the nitrided layer had a hardness of HV 1200 and a thickness of 90 μm. In this case, since the concentration of nitrogen in the chamber was gradually increased, the nitrogen concentration of the formed titanium nitride film was also increased to thus lower the toughness of the film toward the top surface thereof and to make the film more brittle.

Sample 4 (present invention):

The upper test piece 1 was subjected to a gaseous nitriding treatment, was spherically remachined to an 18 mm radius to remove an oxide layer and a white layer of the nitrided layer, and then finished by a buffing process; these treatments are the same as those used for the Sample 1. The obtained test piece 1 was set in an ion-plating device and coated with a titanium nitride film, in a similar manner to that of the above-mentioned Sample 2, except that the introduction of the nitrogen gas (partial pressure of $N_2$) in the step 6 was decreased under the following conditions.

| | |
|---|---|
| 3 × 10$^{-4}$ Torr | 40 min.; |
| 5 × 10$^{-4}$ Torr | 30 min.; |
| 7 × 10$^{-4}$ Torr | 30 min.; and |
| 1 × 10$^{-5}$ Torr | 15 min. |

The obtained test piece 1 (Sample 4) was provided with the titanium nitride film having a hardness of HV 1780 and a thickness of 2.5 μm, and the nitrided layer had a hardness of HV 1200 and a thickness of 90 μm. In this case, since the concentration of nitrogen in the chamber was gradually decreased, the nitrogen concentration of the formed titanium nitride film was also decreased, to thus lower the hardness of the film toward and up to the top surface is HV 1800 or less.

The upper test piece 1 of Samples 1 to 4 and the lower test piece 4 were set in the block 2 and the movable block 5, respectively, and the wear tester (FIG. 4) operated under the following conditions.

Stroke: 50 mm;
Lubricant oil: JIS 2 light oil sprayed as a mist at 3 cc/min;
Running-in period: 2 kg × 100 spm × 5 min.
Test period: 10 kg × 600 spm × 10 Hr.
[* spm . . . stroke per minute]

Figure 4A:
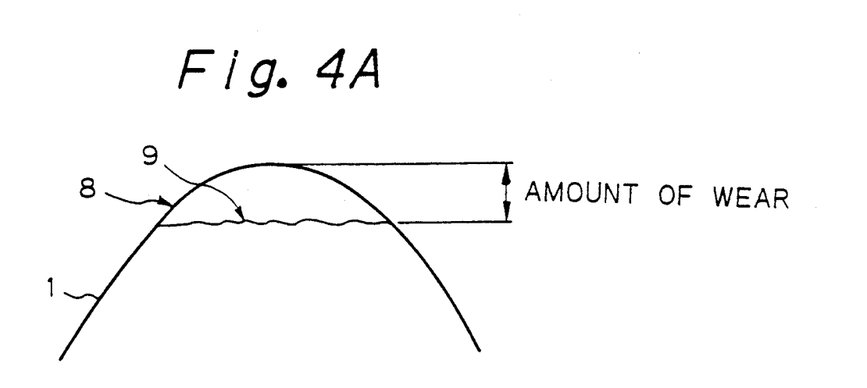
FIG. 4A is a partially sectional view of an upper test piece corresponding to a piston ring, for measuring an amount of wear.
Figure 4B:
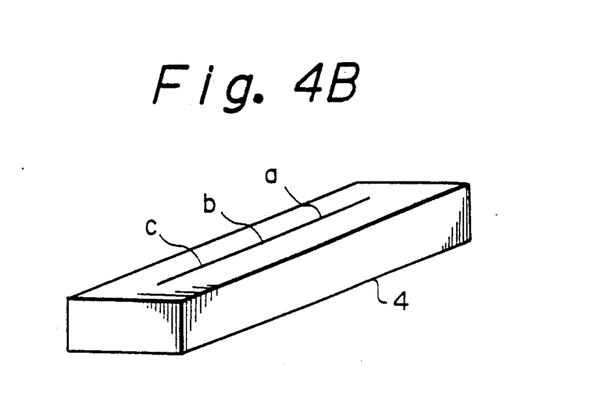
FIG. 4B is a perspective view of a lower test piece corresponding to a cylinder.
Figure 5:
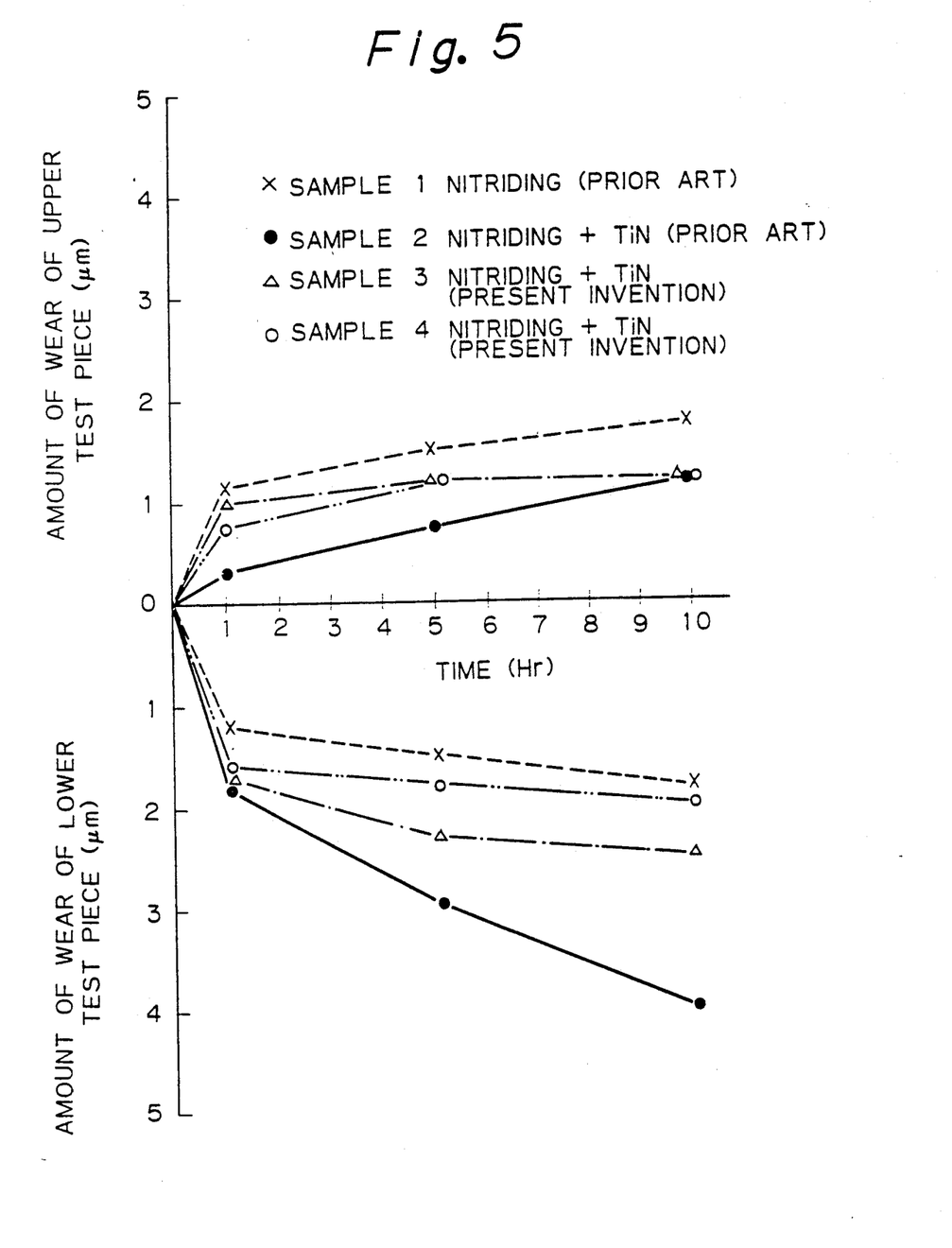
FIG. 5 is a graph showing the results of measurements of the amounts of wear of the upper and lower test pieces.

During the test operation, the upper test piece 1 was pressed against the lower test piece 4 at a pressure of 10 kg (or 2 kg) by the actuator 3, and simultaneously, the movable block 5 was reciprocally moved by the crank-mechanism 6, whereby the Sample 1 and the lower piece 4 were made to slide on each other while lubricated with oil condition. As a result, the amount of wear of the sliding portion of the upper test piece 1, as shown in FIG. 4A, was as indicated by a difference between the original surface 8 and the worn surface 9. The contacting portion of the lower test piece 4 was also worn to form a recess, as shown in FIG. 4B. An amount of wear of the piece 4 was calculated by averaging three recess depths measured at three points a, b and c. The obtained amounts of wear of Samples 1 to 4 are indicated by broken lines, solid lines, one-dot chain lines, and two-dot chain lines, respectively, in FIG. 5.

EXAMPLE 2

Figure 6:
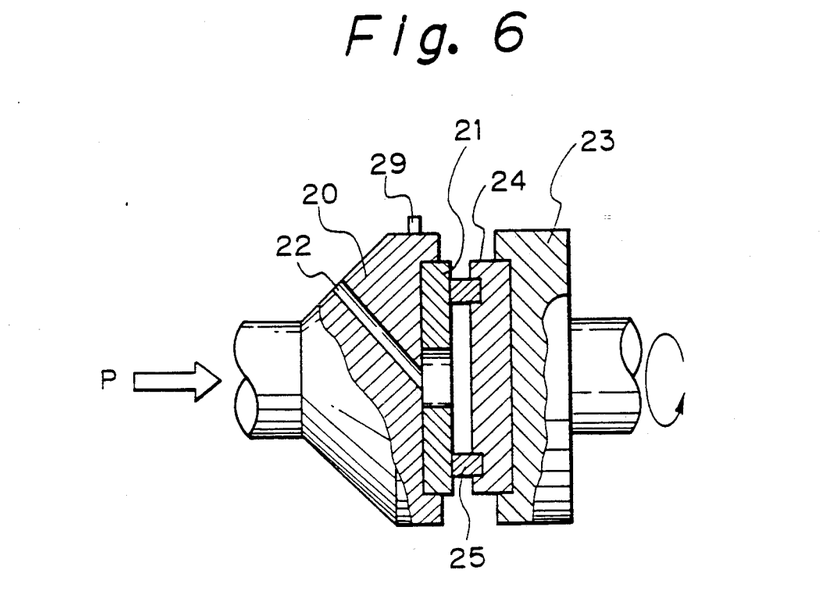
FIG. 6 is a perspective view of a pin-disc type wear tester.
Figure 7:
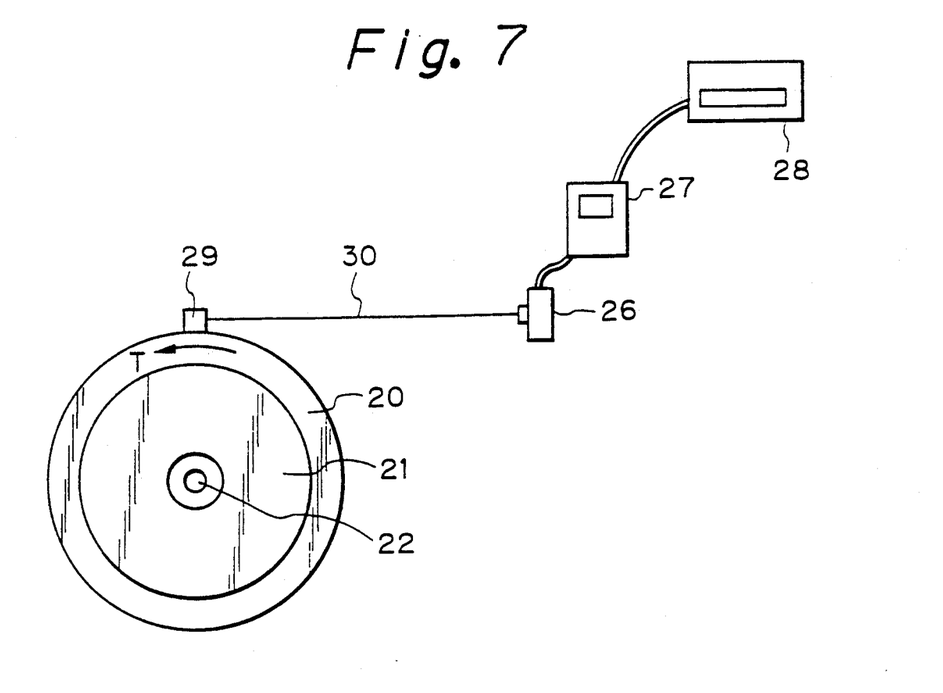
FIG. 7 is an explanatory view of the wear tester of FIG. 7 during operation.

A wear (scuffing) test for measuring the seizing property was performed by using a pin-rotating disc type wear tester as shown in FIGS. 6 and 7, under the following conditions.

The wear tester comprised a stator 20 holding a disc 21 and provided with a load cell 26, and a rotor 23 rotated at a predetermined speed by a drive means (not shown). The disc 21, corresponding to a cylinder, was fixed on an end surface of the stator 20 and had a center hole communicating with a through hole 22 for a lubricant oil. The rotor 23 held a sample holder 24 on an end surface thereof facing the disc 21, and the holder 24 carried four test pieces (sample) 25 which corresponded to a piston ring and were arranged in a concentric circle at constant intervals. The stator 20 was pressed against the rotor 23 by a predetermined load P, and simultaneously, the rotor 23 rotated so that the test pieces 25 came into contact with (i.e., slid on) the disc 21 while being lubricated with oil.

During the wear (scuffing) test, the load P applied to the stator 20 was stepwisely increased at regular intervals, and a friction force generated by the sliding contact between the disc 21 and the test pieces 25 was detected by the load cell 26, as a torque T, through a probe 29 and a wire 30 (FIG. 7). A variation detected by the load cell 26 was read by a dynamic strain guage 27 and recorded by a recorder 28. When a seizure (scoring) occurred, the torque T was sharply increased, and therefore, the load (or pressure applied to the test pieces) at which the sharp increase of the torque T occurred was regarded as a seizure load (pressure) when grading the anti-seizure property.

(1) Test pieces:

A. the disc 21 had an outer diameter of 80 mm, an inner diameter of 30 mm and a thickness of 10 mm, and was made of a cast iron normally (FC 25, JIS G5501) used for a cylinder block. A test surface of the disc 21 was buffed to a surface roughness 0.1 μm or less, and had a hardness of HRB 90.

B. the test piece 25 was a martensitic stainless steel pin having a square section of 5 mm sides and a length of 10 mm and made of SUS 440B. The test piece 25 was subjected to the following surface treatment to form samples 5 to 9.

Sample 5 (prior art):

The test piece 25 was subjected to a plating treatment to form a hard chromium plating film having a thickness of 50 μm on the surface thereof, and the plated film was polished with an emery paper to a desired roughness. The hardness of the plating film was HV 910.

Sample 6 (prior art):

The test piece 25 was subjected to a gaseous nitriding treatment to form a nitrided layer therein, was machined to remove an oxide layer and a white layer of the nitrided layer, and then finished, by using an emery paper, to a desired roughness. The obtained Sample 6 (corresponding a piston ring) was provided with a nitride layer having a thickness of 90 μm and a hardness of HV 1200.

Sample 7 (prior art):

The test piece 25 obtained in Sample 5 was set in an ion-plating device and coated with a titanium nitride film under the same conditions as those of Sample 2. The obtained test piece 25 (Sample 7) was provided with the titanium nitride film having a hardness of HV 2500 and a thickness of 2.5 μm, and the nitrided layer had a hardness of HV 1200 and a thickness of 90 μm.

Sample 8 (present invention):

The test piece 25 obtained in Sample 5 was set in an ion-plating device and coated with a titanium nitride film under the same conditions as those of Sample 3. The obtained test piece 25 (Sample 8) was provided with a titanium nitride film having a hardness of HV 2000 and a thickness of 2.5 μm, and the nitrided layer had a hardness of HV 1200 and a thickness of 90 μm.

Sample 9 (present invention):

The test piece 25 obtained in Sample 5 was set in an ion-plating device and coated with a titanium nitride film under the same conditions as those of Sample 4. The obtained test piece 25 (Sample 9) was provided with a titanium nitride film having a hardness of HV 1750 and a thickness of 2.5 μm, and the nitrided layer had a hardness of HV 1200 and a thickness of 90 μm.

Figure 8:
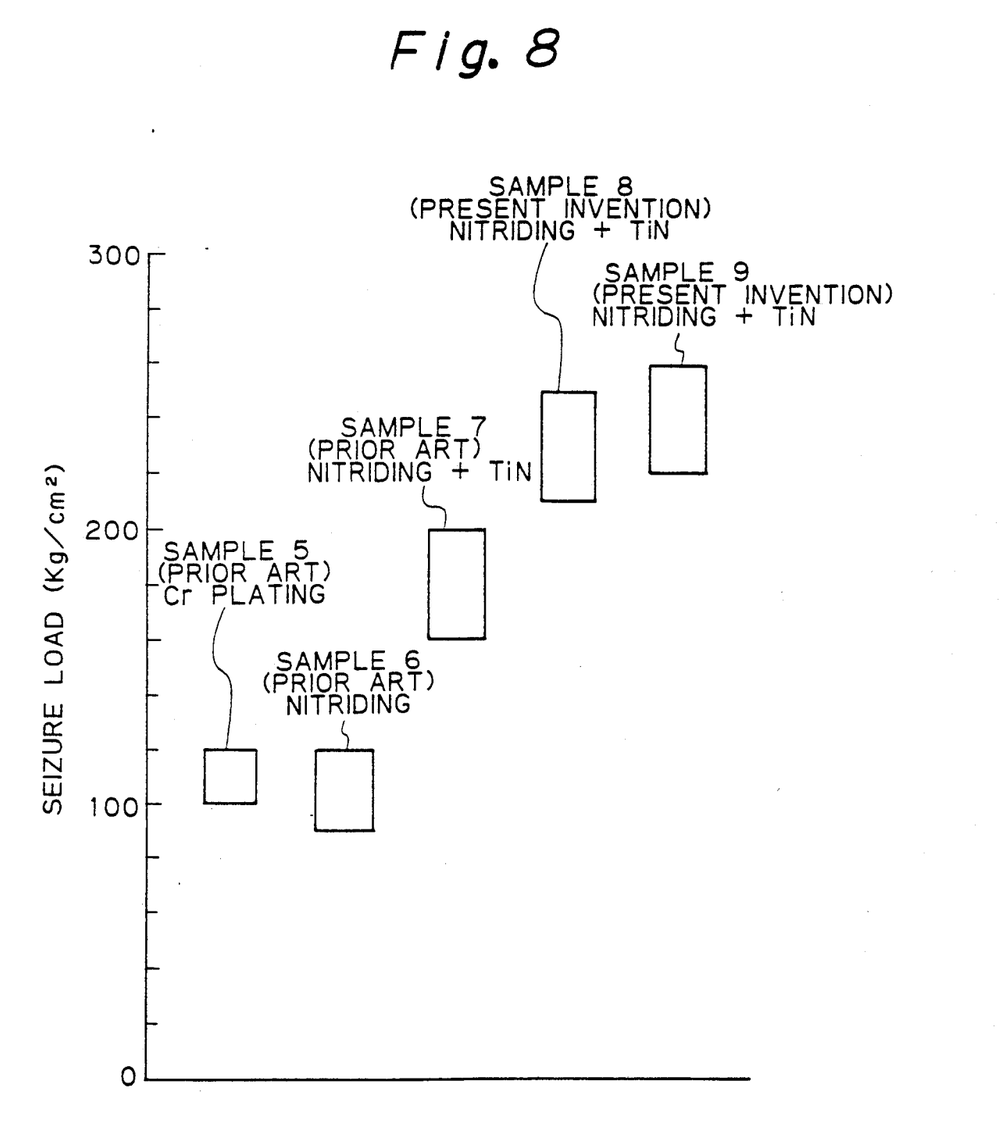
FIG. 8 is a graph showing the results of seizure loads on test pieces.

The four test pieces 25 of Samples 5 to 9 and the disc 21 were set in the wear tester shown in FIGS. 7 and 8, and the tester operated under the following conditions.

Sliding speed (rotational speed at the test pieces): 8 m/sec;

Lubricant oil: SAE SE grade 10W-30 motor oil;

Lubricant oil temperature: 80° C.;

Amount of lubricant oil supplied: 300 cc/min.;

Load pressure (load P/ contacting area of four test pieces): 20 kg/cm$^2$ (increased by 10 kg/cm$^2$ every 3 minutes)

During the test operation, a strain (torque T) variation was monitored by the load cell 26, strain guage 27 and recorder 28, and a sharp change detected as a seizure. The results obtained from Samples 5 to 9 are shown in FIG. 9.

Figure 9:
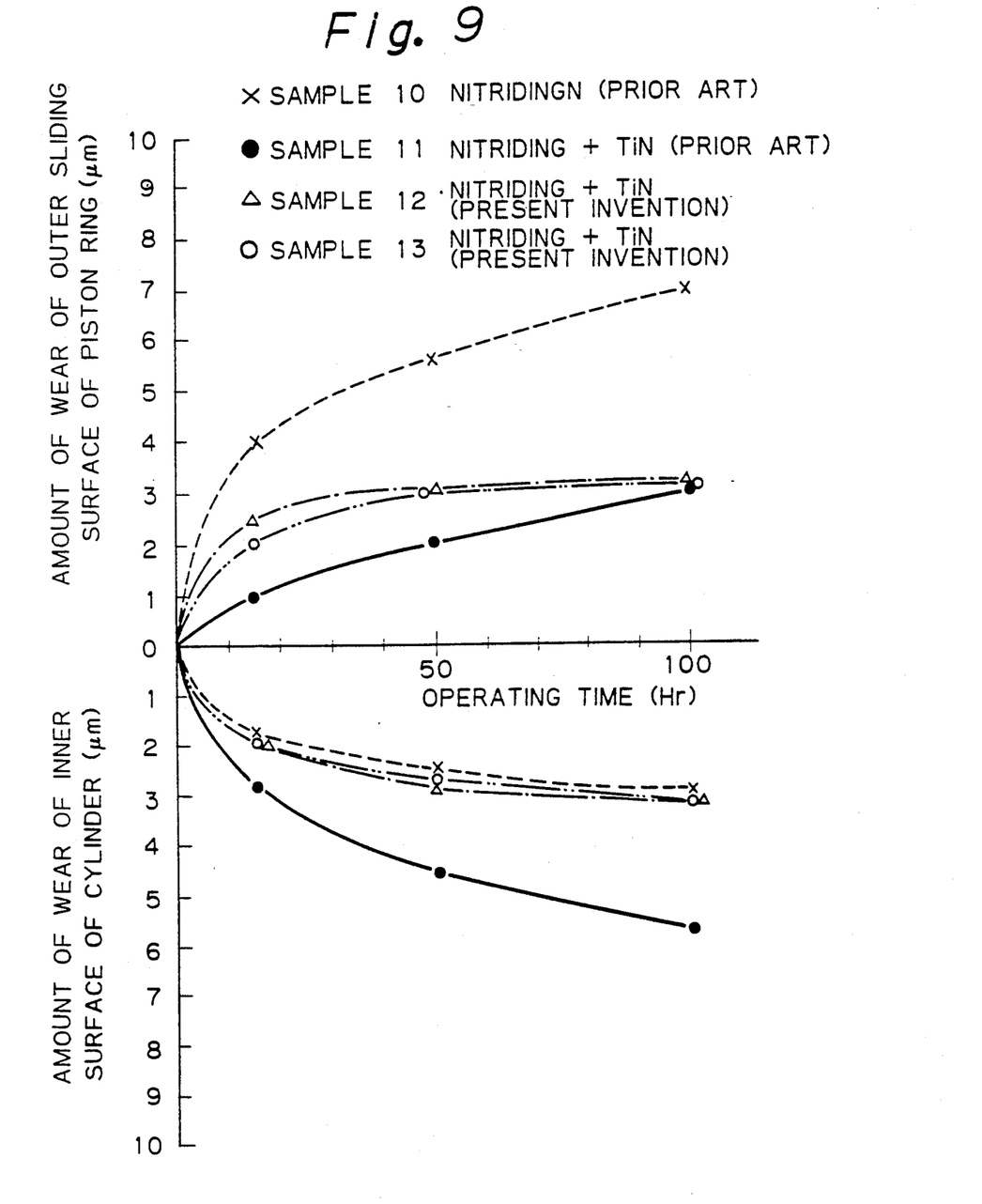
FIG. 9 is a graph showing the results of measurements of the amounts of wear of the piston rings and cylinders during bench tests of the engines.
Figure 10A:
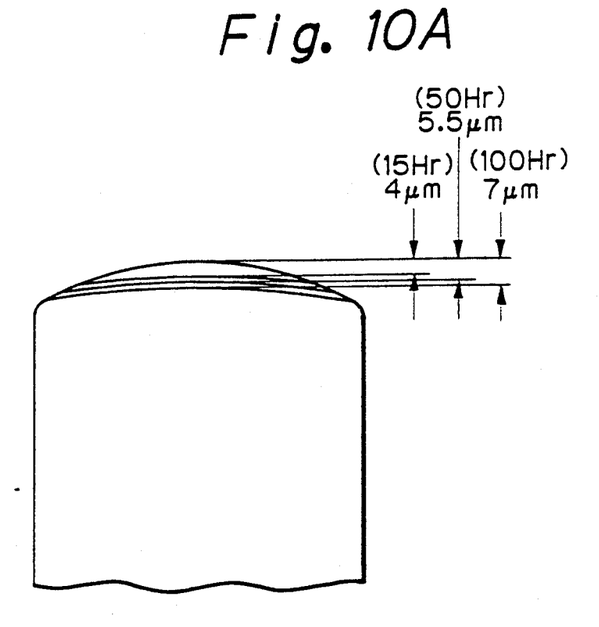
FIGS. 10A to 10D are partially sectional views of piston rings showing the process of wear thereof, respectively.
Figure 10B:
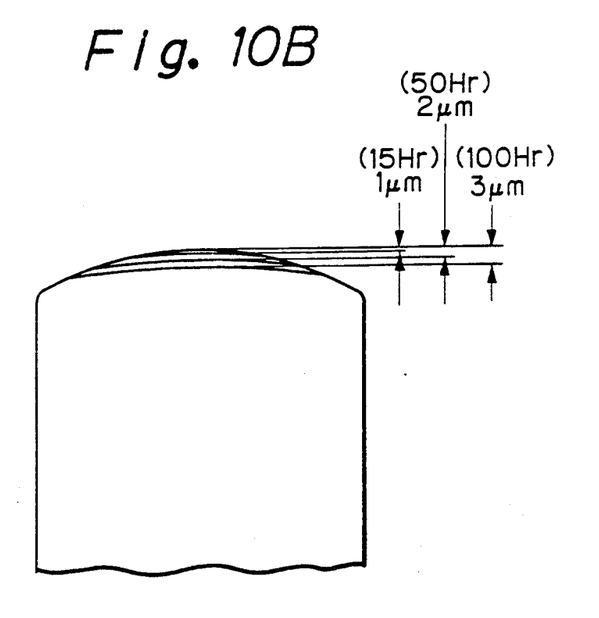
Figure 10C:
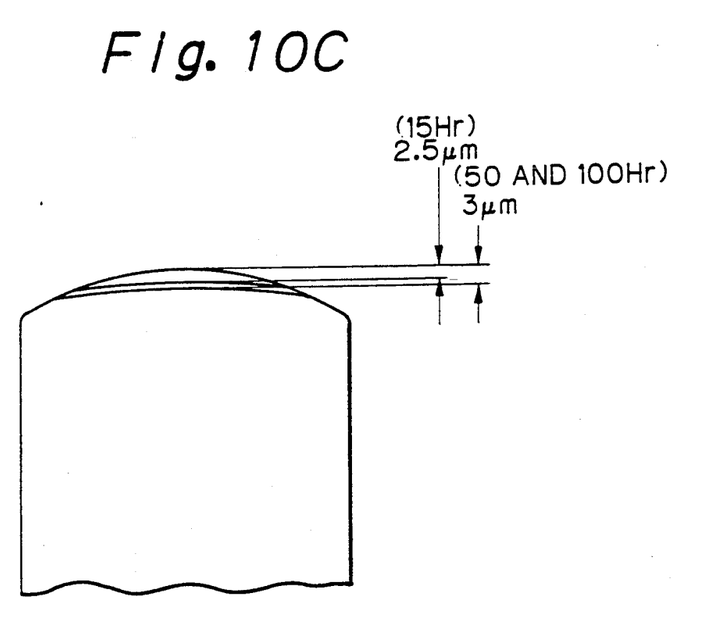
Figure 10D:
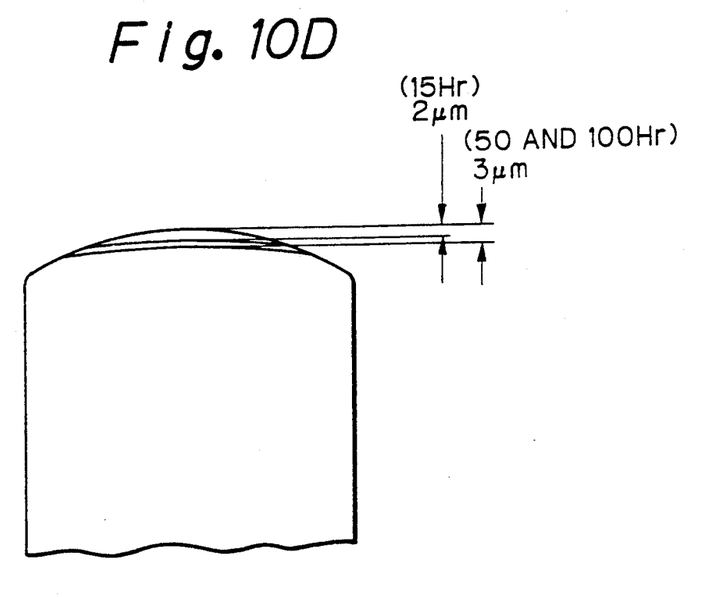

As can be seen from FIG. 9, the Samples 8 and 9 according to the present invention have a superior anti-seizure property (higher seizure load) than Samples 5 to 7 of the prior art, and it is considered that this superior anti-seizure property is due to the formation of a good sliding surface at an initial test period, since the titanium nitride film according to the present invention has a quick break-in time.

EXAMPLE 3

A bench test of engine for checking scuffing of the piston ring and cylinder was performed by using the piston ring of the following Samples 10 to 13 under the following conditions.

(1) Engine:

A water-cooled type four-cycle gasoline engine with six cylinders having a total displacement of 2000 cc was operated during the test at an engine speed of 5200 rpm, a cooling water temperature of 110° C., an engine oil temperature of 130° C. or more, at a full load. The cylinder block of the engine was made of a cast iron corresponding to FC 25.

(2) Piston ring:

The piston ring was made of SUS 440B (martensitic stainless steel) and machined to desired dimensions. The piston ring was subjected to the following surface treatments to form Samples 10 to 13.

Sample 10 (prior art):

The piston ring was subjected to a gaseous nitriding treatment to form a nitride layer thereon. An oxide layer and a white layer of the nitrided layer were removed and the piston ring finished by a buffing process. The obtained piston ring of Sample 10 was provided with nitride layer having a thickness of 90 μm, a hardness of HV 1200, and a roughness of a sliding surface thereof of 0.8 μmRz.

Sample 11 (prior art):

The piston ring obtained in Sample 10 was set in an ion-plating device and coated with a titanium nitride film under the same conditions as those to Sample 2. The obtained piston ring (Sample 11) was provided with a titanium nitride film having a hardness of HV 2400, a thickness of 4 μm, and a roughness of a sliding surface thereof of 0.8 μmRz, and the nitrided layer had a hardness of HV 1200 and a thickness of 90 μm.

Sample 12 (present invention):

The piston ring obtained in Sample 10 was set in an ion-plating device and coated with a titanium nitride film under the same condition as those of Sample 3. The obtained piston ring (Sample 12) was provided with a titanium nitride film having a hardness of HV 2000, a thickness of 4 μm, and a roughness of a sliding surface thereof of 0.8 μmRz, and the nitrided layer had a hardness of HV 1200 and a thickness of 90 μm.

Sample 13 (present invention):

The piston ring obtained in Sample 10 was set in an ion-plating device and coated with a titanium nitride film under the same conditions as those of Sample 4. The obtained piston ring (Sample 13) was provided with a titanium nitride film having a hardness of HV 1780, a thickness of 4 μm, and a roughness of a sliding surface thereof of 0.8 μmRz, and the nitrided layer had a hardness of HV 1200 and a thickness of 90 μm.

The produced piston rings of Samples 10 to 13 were fixed on pistons, and the pistons set in the above-mentioned engine. The engine was operated by leaded gasoline for 10 hours, under the above-mentioned conditions, at least two times. After the bench test, the sliding outer surface of the piston rings and the sliding inner surface of the cylinders were observed and it was found that, scuffing had occurred in Sample 10; in Sample 11, scuffing had not occurred but scratches could be seen; and in Samples 12 and 13, no scuffing occurred and no scratches were seen. Therefore, the piston rings (of Samples 12 and 13) according to the present invention had a quick break-in time and anti-seizure property.

EXAMPLE 4

Another bench test as an endurance test of the engine was performed by using the above-mentioned piston rings of Samples 10 to 13 and the engine, to investigate the amounts of wear of the piston rings and the cylinders. The produced piston rings of Samples 10 to 13 were set in the engine (water-cooled type, four-cycle gasoline engine with six cylinders having a displacement of 2000 cc), and the engine operated at an engine speed of 5200 rpm, a cooling water temperature of 90° C., an engine oil temperature of 110° C. or more, at a full load, using leaded gasoline, for 100 hours. The amounts of wear of the worn portions (sliding surfaces) were measured, the results are shown in FIG. 10. The wear of the outer sliding surfaces of the piston rings of Samples 10 to 13 was measured, as shown in FIGS. 11A to 11D respectively, at 15, 50, and 100 hours.

As shown in FIGS. 10 and 11A to 11D, the conventional piston ring of Sample 11 had less amount of wear than that of the piston rings of Samples 12 and 13 (present invention) in an initial operation period, but the amount of wear of the cylinder was larger than that of Samples 12 and 13. A total amount of wear of each of the Samples 12 and 13 was smaller than that of Sample 11. After 100 hours operation, there was no difference between the amounts of wear of the piston rings of the prior art Sample 11 and of the present invention Samples 12 and 13, but nevertheless the piston rings of the present invention were preferable to that of the prior art Sample, since the cylinder wear caused by the piston rings of the present invention case is less than that caused by the prior art Sample 11. The conventional piston ring of Sample 10 without a titanium nitride film had the largest amount of wear among all of the tested piston rings. According to the present invention, the outer sliding surface conditions of the piston ring are improved to provide more suitable friction conditions in an initial operation period, and this has a great influence on the wear-resistances of the piston ring and cylinder in the following operation period.

As mentioned above, the piston ring according to the present invention has a superior wear-resistance, superior anti-seizure property, and quick break-in time (superior initial adaptability).

It will be obvious that the present invention is not restricted to the above-mentioned embodiments and that many variations are possible for persons skilled in the art without departing from the scope of the invention.

I claim:

1. A piston ring comprising a martensitic stainless steel ring having a nitrided layer formed in the surface portion thereof, and a titanium nitride film coated at least on the outer sliding surface of said ring by an ion-plating process, characterized in that said titanium nitride film has a nitrogen concentration which is gradually increased toward the top surface thereof by increasing a nitrogen partial pressure during said ion-plating process to gradually lower a toughness of the film toward the top surface thereof and to make a surface portion of the film more brittle than the remainder of the film.

2. A piston ring according to claim 1, wherein said nitrogen concentration of said titanium nitride film varies in accordance with an increase in a variation of the nitrogen concentration of from $3 \times 10^{-4}$ to $1 \times 10^{-3}$ Torr.

3. A piston ring comprising a martensitic stainless steel ring having a nitrided layer formed in the surface portion thereof, and a titanium nitride film coated at least on the outer sliding surface of said ring by an ion-plating process, characterized in that said titanium nitride film has a nitrogen concentration which is gradually decreased toward the top surface thereof by lowering a nitrogen partial pressure during said ion-plating process to gradually lower a hardness of the film toward the top surface and to make a surface hardness of the film of not more than HV 1800 or less.

4. A piston ring according to claim 3, wherein said nitrogen concentration of said titanium nitride film varies in accordance with a decrease in a variation of the nitrogen concentration of from $3 \times 10^{-4}$ to $1 \times 10^{-5}$ Torr.

* * * * *